Dec. 31, 1957     H. F. ELKIN     2,818,307
APPARATUS FOR ELEVATING GRANULAR SOLIDS
Filed Sept. 28, 1955
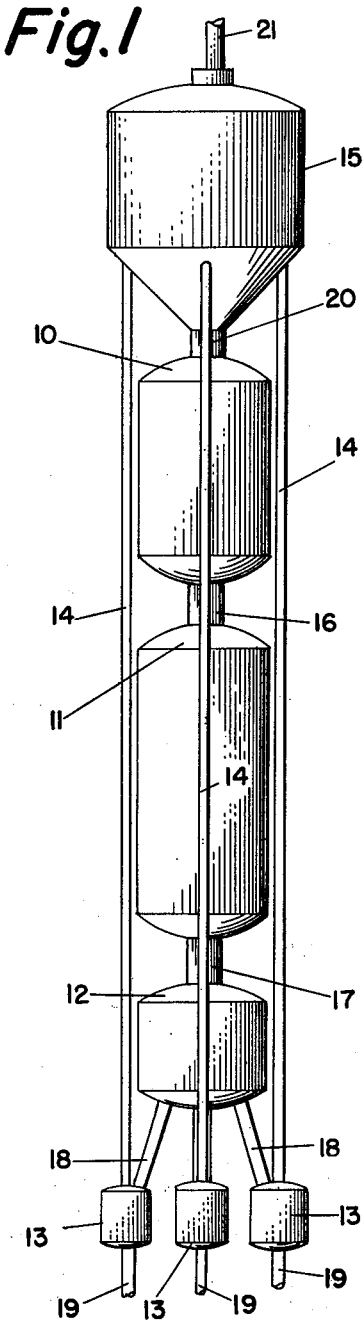
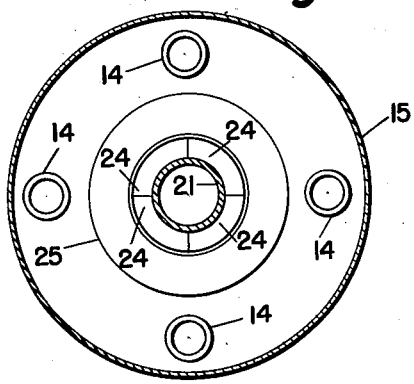
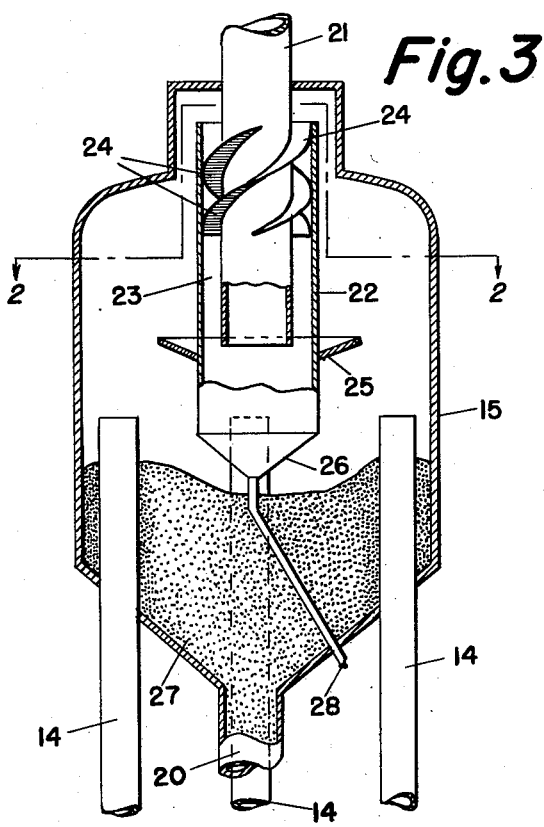
INVENTOR.
HAROLD F. ELKIN
BY Robert O. Spindle
ATTORNEY

United States Patent Office 2,818,307
Patented Dec. 31, 1957

2,818,307

APPARATUS FOR ELEVATING GRANULAR SOLIDS

Harold F. Elkin, Cynwyd, Pa., assignor to Sun Oil Company, Philadelphia, Pa., a corporation of New Jersey Application September 28, 1955, Serial No. 537,106

4 Claims. (Cl. 302—59)

This invention relates to apparatus and process for elevating granular solids by means of a lifting gas, and more particularly to process and apparatus for disengaging granular solids from lifting gas after such elevation.

It is known in the art to elevate granular solids by suspending such solids in a lifting gas under pressure, and conveying the suspension upwardly through elongated confined lifting zones to a disengaging zone in which room for expansion of the lifting gas is provided in order that the granular solids may be disengaged from the lifting gas and dropped into a lower portion of the disengaging zone. It is also known in the art to provide, in a single unit, a plurality of lift conduits discharging into a common disengaging vessel. Such operation has important advantages, as known in the art, in that large volumetric flow rates of granular solids can be obtained while using lift conduits of relatively small cross-sectional area. The use of lift conduits having small cross-sectional area provides a beneficial flow pattern in the lift conduit, with resulting reduction of attrition of the solids during the lifting operation.

Such lifting operations are beneficially applied in various processes, one important application involving the transportation of granular cracking catalyst as employed in the petroleum industry in the so-called Houdriflow process, involving the gravitation of granular catalyst in compact form through a cracking or reaction zone and a catalyst regeneration zone in series, followed by pneumatic elevation of the cracking catalyst to a disengaging vessel positioned above the reaction zone. This general scheme of operation is also applicable to other petroleum conversion processes, and also to processes outside the petroleum field.

A serious problem which may arise in pneumatic elevation operations such as those previously described is the difficulty of obtaining satisfactorily complete disengaging of granular solids from lifting gas following the elevation operation. Economic considerations frequently require that the lifting gas be discharged to the atmosphere from the disengager vessel, and incomplete separation of granular solids from lifting gas prior to such discharge results in the loss of excessive quantities of granular solids, and also in the possibility of air pollution. The present invention provides a novel manner of obtaining satisfactory separation of granular solids from lifting gas prior to the discharge of the latter from the disengaging vessel.

The invention will be more fully described with reference to the attached drawing, in which Figure 1 is a schematic representation of a catalytic cracking system including a plurality of lift conduits for elevation of cracking catalyst to a common disengaging vessel, and in which Figures 2 and 3 are plan and elevation views respectively of the disengager vessel and the upper portions of the lift conduits.

Referring to Figure 1, which does not show details of the present invention, there are shown therein a reactor vessel 10, a regenerator vessel 11, a regenerated solids hopper 12, a plurality of engager vessels 13, a plurality of lift conduits 14 and a disengager vessel 15. In operation, granular cracking catalyst is gravitated as a compact mass through the reactor vessel 10, wherein it is contacted with hydrocarbon cracking charge introduced through means not shown. The contacting is performed under cracking conditions, and the cracking products are removed from reactor 10 through means not shown. The catalyst, having carbonaceous materials deposited thereon as a result of the cracking operation, is gravitated through line 16 into regenerator 11, wherein it is contacted under combustion conditions with oxygen-containing gas introduced by means not shown. The flue gases produced in the regeneration are withdrawn from regenerator 11 through means not shown, and are subsequently employed as lifting gas in the elevation of the cracking catalyst. The regenerated catalyst is withdrawn through line 17 into regenerated solids hopper 12, and is then passed as a plurality of streams through lines 18 into the respective engagers 13.

Lifting gas under pressure is introduced through the lines 19 into each of the engager vessels 13, and carries granular catalyst upwardly through each of the lift conduits 14. A portion of the flue gas withdrawn from regenerator 11 is compressed and used as the lifting gas in the elevation operation. Catalyst is discharged from each of the lift conduits 14 into the disengager 15, wherein the solids fall out of the lifting gas into the bottom of the disengager, being removed therefrom through line 20 and re-introduced into reactor 10.

Lifting gas, from which solids have been removed by means described more fully in connection with Figures 2 and 3, is withdrawn from disengager 15 through line 21 and discharged to the atmosphere.

Referring now to Figures 2 and 3, there are shown therein the disengager vessel 15, the lift conduits 14, the lifting gas outlet conduit 21 and the solids outlet conduit 20. Positioned within disengager 15 and supported by suitable means not shown is a substantially vertical, cylindrical sleeve 22, which surrounds the lower portion of the lifting gas outlet conduit 21, providing an annular space 23 between the sleeve 22 and the outlet conduit 21. In plan view, the lifting gas outlet conduit 21 and the sleeve 22 are located within a central region around which the upper ends of the lift conduits 14 are arranged. Baffle members 24 are positioned within the annular space 23, and are secured to the outer surface of the lifting gas outlet conduit 21. The outer edges of the baffles, which are helical in shape, need not be secured to the sleeve 22 but may either fit tightly therein or have a close clearance within the sleeve. Secured to the outer surface of the sleeve 22 at a lower level is a baffle 25, which is laterally extending, and adapted to receive a portion of the solids which fall out of the lifting gas streams prior to the passage of the latter into the annulus 23 as subsequently described. Secured to the lower end of the sleeve 22 is a conical member 26 providing a receptacle for solids which pass through annulus 23 together with lifting gas.

In operation, lifting gas containing suspended catalyst is discharged from the upper ends of the lift conduits 14, and lifting gas from each of the conduits passes upwardly in the disengager vessel 15 and into the upper end of the annulus 23. Prior to entry of lifting gas into annulus 23, a large proportion of the suspended solids fall out of the lifting gas stream and downwardly in disengager 15 onto the upper surface of baffle 25. Solids are withdrawn from the upper surface of baffle 25 through any suitable means not shown and are introduced onto the upper surface of the compact bed 27 of catalyst in the lower portion of the disengager.

The purpose of the baffle 25 is to hinder the fall of solids, and reduce the amount of attrition of solids resulting from sudden interruption of the fall of catalyst, the amount of attrition being generally proportional to the height through which the catalyst falls prior to the sudden interruption of fall. A plurality of baffles similar to the baffle 25 may be secured if desired to the sleeve 22 at various horizontal levels within the disengager; however, for purpose of simplicity and clarity in the drawing, only one such baffle is shown.

Lifting gas from which a large proportion of the solids has been disengaged, passes downwardly through the annulus 23, following a helical path as a result of the presence of the baffles 24 within the annulus 23. Subsequently, the lifting gas reverses its flow and passes upwardly through the lifting gas outlet conduit 21. By virtue of the construction of the conduit 21, sleeve 22 and baffles 24, solids which pass downwardly with the lifting gas through annulus 23 do not, for the most part, pass upwardly with the lifting gas through the outlet conduit 21, and instead pass downwardly into the conical member 26, from which they are removed through line 28 and may be disposed of in any suitable manner.

The process and apparatus according to the invention have important advantages over the use of separating means located outside of the disengager vessel in that the use of such latter means results in apparatus having excessive weight and wind loading. The problem of achieving satisfactory separation of lifting gas from solids in a case involving large volumes of lifting gas passing through the apparatus cannot be adequately solved by the use of separating means located outside the disengaging vessel. The problem is solved in a highly satisfactory manner, however by use of process and apparatus conforming in essential details to that described in connection with the drawings.

The process according to the invention is applicable to granular solids generally, a major proportion of which are too large to pass through a 20 mesh U. S. Sieve Series screen. The chemical nature of solids which can advantageously be handled according to the process of the invention may vary widely. The granular cracking catalyst to which the invention is particularly beneficially applicable includes the well-known synthetic silica-alumina cracking catalyst, activated clay catalyst, etc.

The invention has been described with reference to four lift conduits communicating with the disengager. However, the invention is applicable to any system having two or more lift conduits communicating with a single disengager, the essential feature being that a plurality of conduits are arranged, in plan view, around a central region wherein the annular passage for downflow of lifting gas is located; where two lifts are employed, the annular passage should be, in plan view, between the lift conduits.

The invention claimed is:

1. Apparatus for elevating granular solids by means of lifting gas which comprises: a plurality of lift conduits having their upper ends arranged around a central region within a disengaging vessel; a substantially vertical conduit situated within said central region and having a lower open end and an upper end outside said disengaging vessel; a sleeve surrounding a lower portion of said substantially vertical conduit, said sleeve having its open upper end in gaseous communication with the upper outlet end of each of said lift conduits; baffle means within the annulus between said substantially vertical conduit and said sleeve, said baffle means being adapted to impart a rotary motion to gas passing through said annulus; a receptacle for solids positioned beneath and closing the lower end of said annulus; means for introducing granular solids and lifting gas into each of said lift conduits; means for removing granular solids from said receptacle, and means for removing from said disengaging vessel granular solids other than those introduced into said annulus.

2. Apparatus according to claim 1 and additionally comprising a baffle member attached to the outer surface of said sleeve and adapted to hinder the fall of granular solids within said disengaging vessel.

3. Apparatus according to claim 1 wherein said means for removing granular solids from said receptacle comprise a closed conduit communicating at one end with said receptacle and having its other end located outside said disengaging vessel.

4. Apparatus according to claim 1 and additionally comprising a second sleeve having lesser cross-sectional area than the maximum cross-sectional area of said disengaging vessel, said second sleeve surrounding an upper portion of the first-named sleeve and providing with said first-named sleeve a second annulus communicating at its upper end with the first-named annulus, and additionally comprising a transverse plate spaced above the upper end of said first-named sleeve and closing said second annulus at the upper end thereof.

References Cited in the file of this patent
UNITED STATES PATENTS

| | | |
|---|---|---|
| 2,010,231 | Heist | Aug. 6, 1935 |
| 2,412,152 | Huff | Dec. 3, 1946 |
| 2,663,595 | Ardern | Dec. 22, 1953 |